United States Patent

Hanson et al.

[11] Patent Number: 5,096,219
[45] Date of Patent: Mar. 17, 1992

[54] FULL VEHICLE SUSPENSION CONTROL WITH NON-VERTICAL ACCELERATION CORRECTION

[75] Inventors: Reed D. Hanson, Dayton; Kamal N. Majeed, Centerville, both of Ohio

[73] Assignee: General Motors Corporation, Detroit, Mich.

[21] Appl. No.: 628,035

[22] Filed: Dec. 17, 1990

[51] Int. Cl.$^5$ .............................................. B60G 11/26
[52] U.S. Cl. .................................... 280/707; 200/772; 200/689; 200/DIG. 1
[58] Field of Search .......... 280/707, 772, 689, DIG. 1

[56] References Cited

U.S. PATENT DOCUMENTS

| | | | |
|---|---|---|---|
| 4,761,022 | 8/1988 | Ohashi et al. | 280/772 |
| 4,898,257 | 2/1990 | Brandstadter | 280/707 |
| 4,905,152 | 2/1990 | Kawabata | 280/707 |
| 5,016,907 | 5/1991 | Akatsu et al. | 280/DIG. 1 |
| 5,016,908 | 5/1991 | Athanas et al. | 280/707 |

FOREIGN PATENT DOCUMENTS 2224247 5/1990 United Kingdom ................ 280/707

Primary Examiner—Kenneth R. Rice
Attorney, Agent, or Firm—Robert M. Sigler

[57] ABSTRACT

A full vehicle suspension control for a wheeled vehicle includes a suspension actuator and an absolute accelerometer at each corner of the vehicle body. The actuators are controlled in response to vehicle body pitch and roll velocity signals which are derived from nominally vertical acceleration signals from the accelerometers by first deriving vehicle body pitch and roll acceleration signals and then integrating these signals into vehicle body roll and pitch velocity signals. The process of converting the body corner acceleration signals to pitch and roll acceleration signals reduces any non-vertical error of the signals before integration to reduce saturation of the integrator.

4 Claims, 4 Drawing Sheets

1

FULL VEHICLE SUSPENSION CONTROL WITH NON-VERTICAL ACCELERATION CORRECTION

BACKGROUND OF THE INVENTION

This invention relates to a suspension control for a wheeled vehicle having a body suspended by suspension springs at a plurality of points on unsprung, road contacting wheels.

The co-pending patent application U.S. Pat. No. 07/430,858, entitled Full Vehicle Suspension Control, filed Nov. 2, 1989 by Kamal N. Majeed and assigned to the assignee of this application, describes a real time, full vehicle suspension control in which the desired force exerted by an actuator between each vehicle wheel and its corner of the vehicle body is derived from an equation which includes the linear, weighted sum of the vehicle body heave, roll and pitch velocities. These velocities are derived from an absolute accelerometer at each body corner mounted to sense the (presumably) vertical absolute acceleration of that corner of the vehicle body. In the system as disclosed in that application, each accelerometer signal is integrated to provide a vertical body corner velocity signal, and the heave, roll and pitch velocities are derived from the four vertical body corner velocity signals by straightforward linear mathematical equations.

However, the accelerometers do not produce purely vertical accelerations at all times. Even if the accelerometers are all perfectly vertically aligned on an unaccelerated vehicle, the vehicle body, which is subject to pitch and roll during vehicle acceleration, braking and cornering, often places these sensors at an angle from the purely vertical. The resulting nominally vertical acceleration signals may thus at times include longitudinal or lateral acceleration components which constitute non-vertical errors. These errors, although quite small, may be greatly increased by integration as the body corner acceleration signals are converted to body corner velocity signals. This tendency is even greater if the accelerometers are not perfectly vertically mounted on the vehicle. In addition, the integrator used for converting acceleration signals to velocity signals is bounded: that is, its output is subject to saturation at a maximum output level. Thus, the non-vertical errors, greatly increased during integration, may hasten the onset of integrator saturation and lead to inaccuracy.

SUMMARY OF THE INVENTION

The full vehicle suspension control of this invention reduces any non-vertical error from the accelerometer signals before integration by first deriving vehicle body roll and pitch acceleration signals from the four vehicle body corner acceleration signals and then integrating the vehicle body pitch and roll acceleration signals to generate vehicle body pitch and roll velocity signals. The process of converting from the individual body corner acceleration signals to vehicle body pitch and roll acceleration signals automatically reduces the non-vertical errors by cancellation. The non-vertical errors are thus kept small so that they do not increase the tendency of the bounded integrator to saturate, with the result that the vehicle suspension is more accurately controlled.

An additional benefit is that the suspension control of this invention need only perform three integrations (that is, of heave, roll and pitch accelerations to their corresponding velocities) in order to produce desired force signals for all four wheels, compared with four integrations (that is, of four body corner accelerations to their corresponding velocities) for the case where the integration precedes the conversion from body corner to heave, roll and pitch signals. This significantly reduces computational time.

Further details and advantages of this invention will be apparent from the accompanying drawings and following description of a preferred embodiment.

DESCRIPTION OF THE PREFERRED EMBODIMENT

Figure 1:
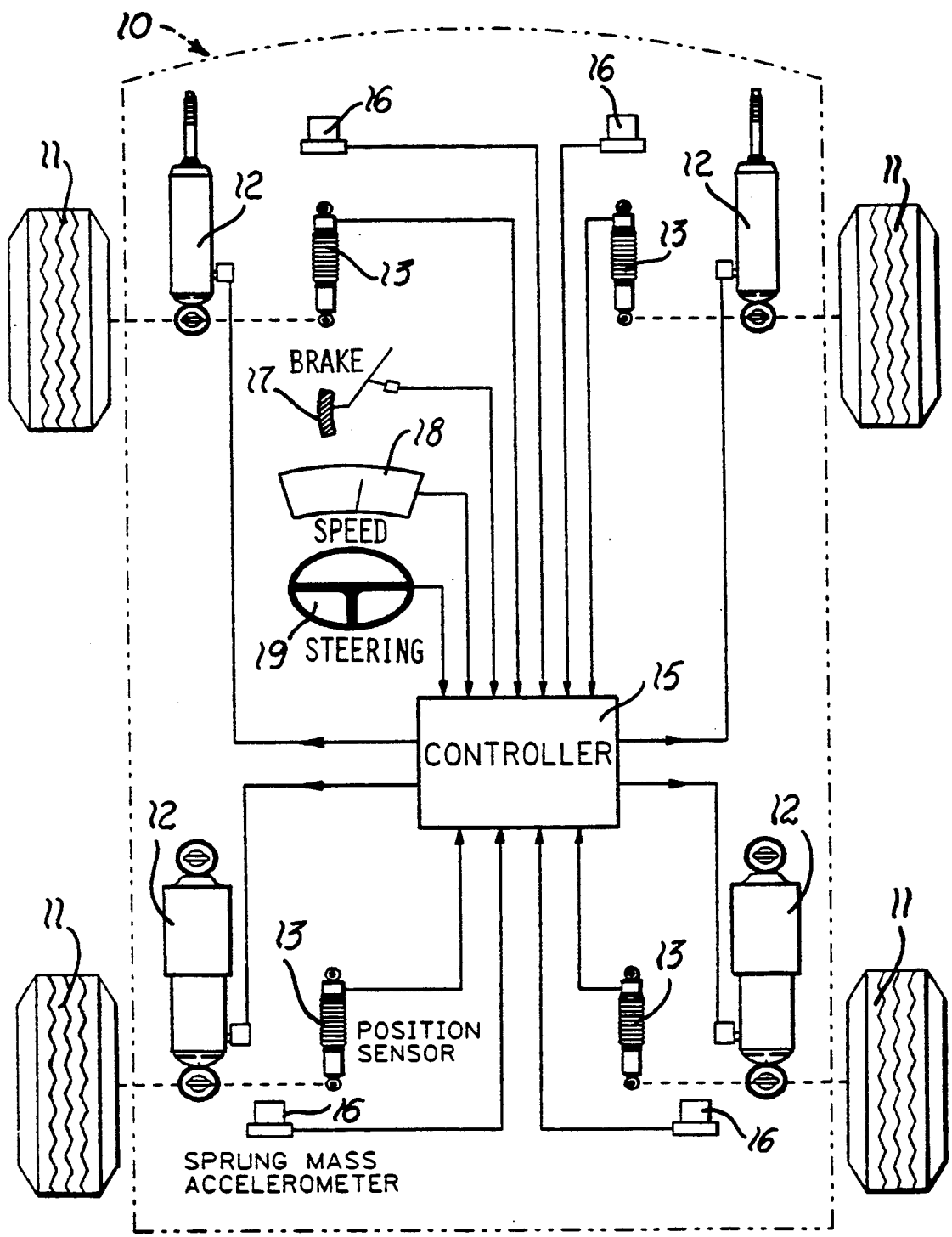
FIG. 1 is a schematic diagram of a motor vehicle with a suspension control according to this invention.

FIG. 1 shows a schematic diagram of a motor vehicle with a suspension control according to the invention. The vehicle has a body 10 comprising a sprung mass. Body 10 is essentially rectangular in shape and is supported on wheels 11 at suspension points comprising each of its corners by suspension apparatus 12 comprising a weight bearing suspension spring in parallel with a suspension actuator connected to exert a controllable force in parallel with the spring between the body 10 and wheel 11 at that suspension point. The suspension actuator may be a hydraulic or electric actuator capable of providing power to the suspension, as used in a fully active suspension control. Alternatively, the actuator may be a variable damper, which is capable only of dissipating power, as used in a semi-active suspension control. If a variable damper, it may provide damping control in either a continuous or a discrete manner. Suspension apparatus 12 further includes an axle for rotatably supporting wheel 11 and such other suspension components, such as control arms, as are required for and comprise the unsprung mass of a standard vehicle suspension.

At each corner of body 10, a suspension position sensor 13 is connected between the body and unsprung masses to measure the relative vertical position thereof and generate an output vertical suspension position signal for input to a controller 15. An LVDT position sensor is suitable for this purpose. The relative vertical suspension position signal may be differentiated to produce a relative body/wheel vertical velocity signal. An absolute acceleration sensor 16 is also positioned at each corner of body 10; and sensor 16 generates an absolute vertical acceleration signal of that corner of body 10 for input to controller 15. Acceleration sensors 16 are mounted with care so as to minimize cross-axis sensitivity which might contaminate the vertical acceleration signal with horizontal acceleration information; however, even the most carefully mounted acceleration sensor will at times be non-vertical due to vehicle body pitch and roll. Additional signals which may optionally be generated are a vehicle deceleration or braking signal by brake sensor 17, a vehicle speed signal from vehicle speed sensor 18 and a vehicle steering signal from vehicle steering sensor 19. These latter signals are not required for the suspension control of this invention and will not be further described. However, many examples of such sensors and their uses for suspension control are known in the prior art.

Figure 2:
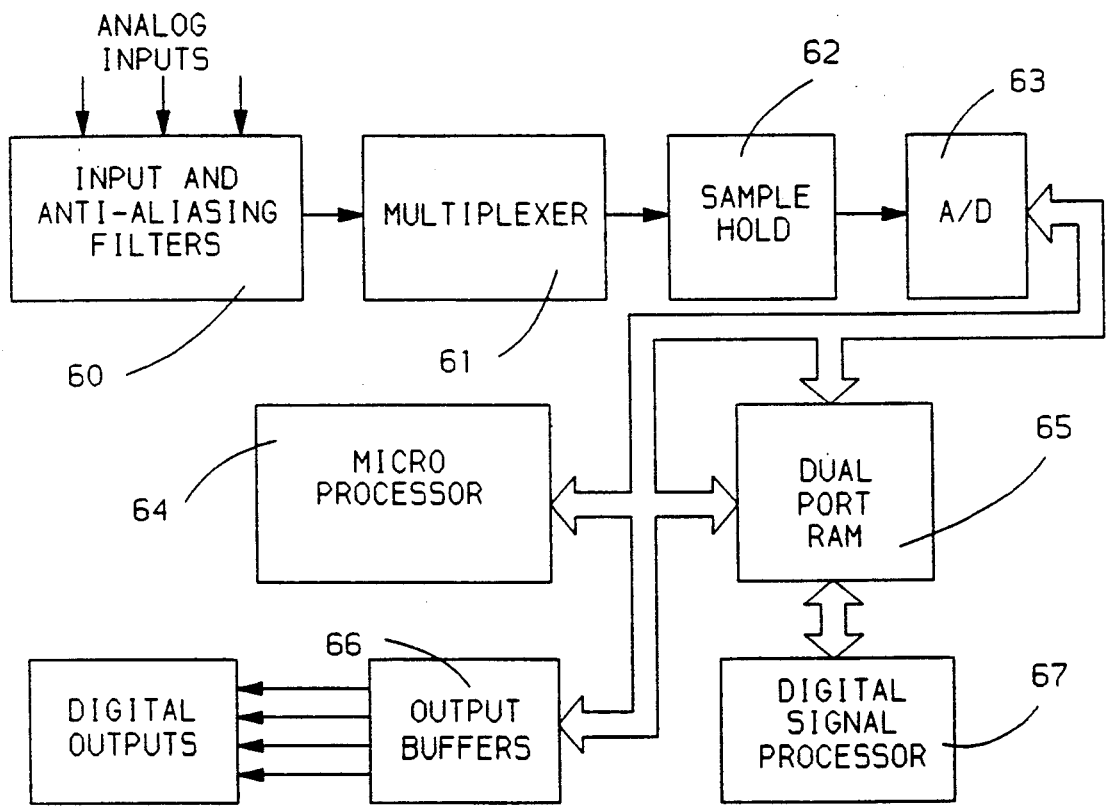
FIG. 2 is a block diagram of a controller for use in the suspension control of the vehicle of FIG. 1.

The hardware configuration of controller 15 is shown in schematic and block diagram form in FIG. 2. The analog inputs from sensors 13, 16, and 17-19 are processed in input apparatus 60, which includes sensor interface circuitry, anti-aliasing filters and any additional analog signal processing such as the differentiating of the relative position signals from sensors 13 to form relative velocity signals.

With regard to the input signals, it should be noted that the control has been found to work well, at least in the case of an on/off damping actuator, with a loop frequency of 1 KHz, which means that, to avoid aliasing distortion, the input signals should be low pass filtered to avoid any significant input signals at frequencies above 500 Hz. The differentiator, especially, needs to be designed with care, since differentiation, by nature, accentuates the high frequencies in the signal and heavy filtering tends to introduce phase delays which can slow system response.

The processed and filtered input signals are read into the system by a multiplexer 61, which provides each signal, in turn, to a sample/hold apparatus 62 and an analog/digital (A/D) converter 63. The signals can be pipelined through this portion of the apparatus to speed data read-in. The output of the A/D apparatus is provided to an eight bit data bus connected also to a microprocessor 64, RAM 65 and output buffers 66. A separate 16 bit data bus connects dual port RAM 65 to a digital signa. processor (D$P) 67. Microprocessor 64, which may, for example, be one of the 68HC11 family made by the Motorola (R) Corporation, contains the basic system operating software and controls the data handling and decision a TMS320C15 or TMS320C17 made by Texas Instruments (R) Corporation, is optimized for mathematical computations such as multiplication, which would greatly slow down a general purpose microprocessor. Such multiplications are used both in the solution of the control equations and in a digital integration routine. The output buffers 66 interface the digital processing apparatus with the four actuators 12 and may further include digital low pass filtering to prevent output of signals at frequencies higher than those to which the actuators need respond. For the embodiment shown, output buffers 66 need only be digital buffers, since the output control signals to the actuators are single bit digital signals selecting high or low damping. In a continuous active or semi-active system, however, suitable digital/analog conversion apparatus would be inserted before the output buffers. The apparatus shown is that used for the original reduction to practice of the system described herein; and a more complete description can be found in the paper "Dual Processor Automotive Controller" by Kamal N. Majeed, published in the proceedings of the IEEE/Applications of Automotive Electronics, Dearborn, Mich., Oct. 19, 1988. However, cost savings may be achieved in a mass produced system by the replacement of the dual port RAM 65 with ordinary RAM and the use of a software controlled interface bus between the microprocessor and DSP and a three line serial interface for input and output, as known to those skilled in the art of microcomputer system design.

Figure 3:
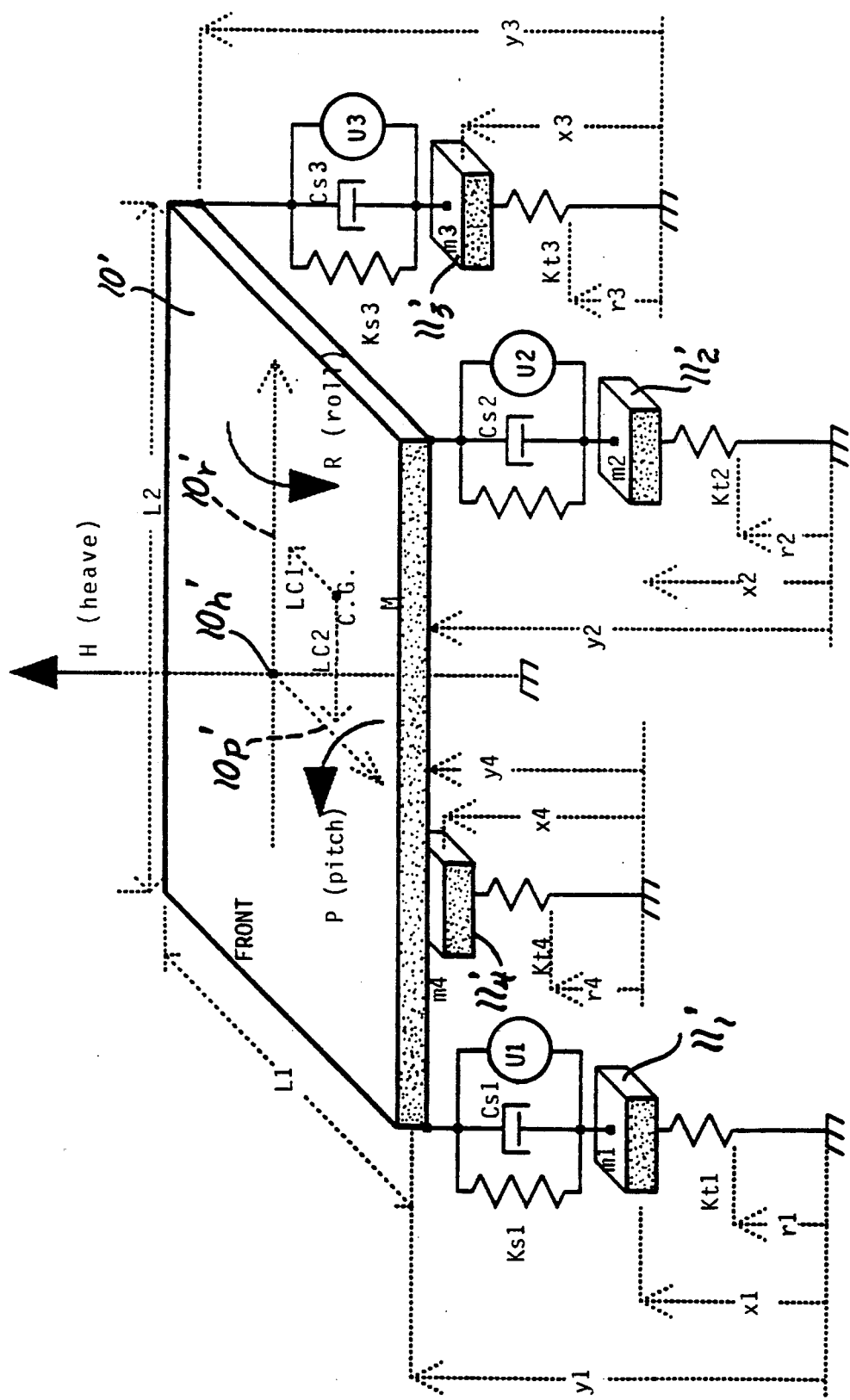
FIG. 3 shows a model of the vehicle of FIG. 1 useful in understanding the suspension control of the vehicle of FIG. 1.
Figure 4:
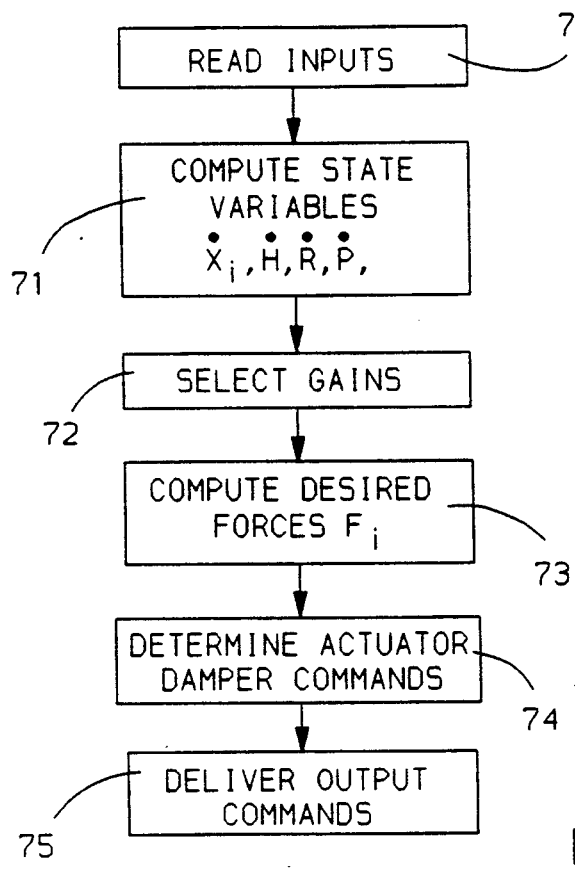
FIG. 4 shows a flow chart illustrating the operation of the suspension control for the vehicle of FIG. 1.

The control implemented in controller 15 may be understood with reference to the model shown in FIG. 3 and the flow chart of FIG. 4. Referring to FIG. 3, a vehicle body or sprung mass 10, with a mass M is an idealized model of body 10 shown in FIG. 1. Movement of vehicle body 10' is defined with respect to a point 10h' and axes 10p' and 10r'. Vertical movement of point 10h' is defined as heave H. Rotational movement of body 10' about axis 10r', which passes through point 10h' and is aligned front to rear with respect to body 10' is defined as roll R. Rotational movement of body 10' about axis 10p', which passes through point 10h' and is aligned right side to left side with respect to body 10', perpendicular to axis 10r', is defined as pitch P.

At each corner of body 10', an unsprung mass $11_i'$ ($i=1,2,3,4$), which is an idealized model of wheel 11 of FIG. 1 (in combination with the other elements contributing to the unsprung mass) and has a mass $m_i$, is related to the ground through a spring constant $K_{ti}$, representing the tire spring force, and to the adjacent corner of body 10, by a spring constant $K_{si}$ representing the suspension spring force, a damping constant $C_{si}$ representing the suspension damper and an external actuator force $U_i$, where $i=1,2,3,4$ for the four corners. The position of each unsprung mass $11_1'$ with respect to an inertial reference frame is $x_i$, and the position of the adjacent corner of body 10, with respect to the same reference is $y_i$. The effective length $L_2$ of body 10 is the distance parallel to axis 10r' between supporting points of front and rear unsprung masses on the same side of body 10. Similarly, the effective width $L_1$ of body 10 is the distance parallel to axis 10p' between supporting points of corresponding left and right unsprung masses.

A seven degree of freedom vehicle model requires 14 states, which may be chosen as six body states, including the heave, roll and pitch positions and velocities ($\dot{H}, \dot{R}, \dot{P}$) and, for each suspension point, wheel position and Velocity ($x_1, \dot{x}_i$). The control, however, does not use all 14 states. Rather, the control uses mainly the velocities as feedback variables and, in the semi-active case, only the velocities. The control law for the force on each wheel ($i=1,2,3,4$), in the case of a fully active suspension, is:

$$F_i = G_{di}D_i + G_{wi}\dot{x}_i + G_{hi}\dot{H} + G_{ri}\dot{R} + G_{pi}\dot{P},$$

wherein $D_i$ is the suspension displacement ($y_i - x_i$), $\dot{x}_i$ is the wheel velocity $\dot{H}$ is the heave velocity, $\dot{R}$ is the roll velocity, $\dot{P}$ is the pitch velocity and $G_{di}, G_{wi}, G_{hi}, G_{ri}$ and $G_{pi}$ are the gains for the contribution of the respective state variables to the force $F_i$. For a semi-active suspension control, with actuators that provide only a damping force, the first term may be eliminated, since it corresponds to a dominant part of the active power required. The control law for a semi-active control is thus:

$$F_i = G_{wi}\dot{x}_i + G_{hi}\dot{H} + G_{ri}\dot{R} + G_{pi}\dot{P}.$$

The control thus combines a local state variable indicative of wheel velocity with centralized state variables indicative of body velocities in the most relevant three modes of heave, roll and pitch and, only in the case of a fully active suspension control, a state variable indicative of suspension displacement, which latter helps control the resonant vibration frequencies of the suspension apparatus (especially to allow lowering the body mode frequency from 1 Hz to about 0.6 Hz). With this control, the desired force between the body and each wheel is essentially independent of the velocities of the other wheels, which provides local control of wheel hop or vibration. In addition, the contributions of body velocities are separated into heave, roll and pitch modes to assist precise tuning of the suspension for body as well as wheel movement.

For the semi-active control, the use of only velocity feedback results in the demand power being mostly dissipative (90 percent of the time), due to the phasor relationships involved. The control is thus naturally well suited to a semi-active suspension control such as that of this embodiment. In practice, it is found that the system provides excellent control of suspension movement without introducing the phase lag and inaccuracy problems of a Kalman filter or Luenberger observer to estimate non-measured states. In addition, the reduced need for processing throughput due to the absence of such filters or observers results in faster processing times and reduced cost in the processor hardware.

Referring to FIG. 4, the main control sequence provides for the reading of inputs (70), followed by the derivation of state variables (71). The state variables $\dot{x}_i$, $\dot{H}$, $\dot{R}$ and $\dot{P}$ are derived from the sensed inputs as follows. The input signal from acceleration sensor 16 at a particular suspension point or corner of the vehicle provides a body corner acceleration signal $\ddot{y}_i$. The heave, roll and pitch accelerations $\ddot{H}$, $\ddot{R}$ and $\ddot{P}$ are derived from the vertical body corner accelerations $\ddot{y}_i$ at the four corners of the vehicle according to the following equations, wherein all variables are accelerations:

$$\ddot{H} = (\tfrac{1}{4})\ddot{y}_1 + (\tfrac{1}{4})\ddot{y}_2 + (\tfrac{1}{4})\ddot{y}_3 + (\tfrac{1}{4})\ddot{y}_4,$$

$$\ddot{R} = -(\tfrac{1}{4}L_1)\ddot{Y}_1 - (\tfrac{1}{4}L_1)\ddot{y}_2 + (\tfrac{1}{4}L_1)\ddot{y}_3 + (\tfrac{1}{4}L_1)\ddot{Y}_4,$$

$$\ddot{P} = -(\tfrac{1}{4}L_2)\ddot{Y}_1 + (\tfrac{1}{4}L_2)\ddot{Y}_2 + (\tfrac{1}{4}L_2)\ddot{Y}_3 - (\tfrac{1}{4}L_2)\ddot{Y}_4.$$

The heave, roll and pitch accelerations H, R, P are then integrated to derive the heave, roll and pitch velocities H, R, P. By converting from body corner accelerations to heave, roll and pitch accelerations, the non-vertical (longitudinal and lateral) components of the accelerations cancel in the roll and pitch equations. As an example, suppose that, due to a vehicle turn, the vehicle body is leaning to the left; and there is thus an identical lateral error in each of the body corner accelerations. An examination of the equations above for pitch and roll accelerations (but not the heave acceleration) shows that this error term will be added and subtracted twice from each equation and will thus produce no change in the output pitch and roll acceleration values.

Theoretically, the same errors, integrated into larger values, would similarly cancel in the corresponding equations for pitch and roll velocities if the integrations were performed first. However, this is not necessarily the case in the "real world", wherein integrators are bounded: that is, subject to saturation in the output. A positive non-vertical acceleration error term will grow and increase the integrator's output significantly, thus possibly causing the output to saturate at times when it otherwise would not have done so. It is in the interest of accuracy in a linear system to reduce such instances of non-linear staruation.

The vertical body corner velocities $\dot{y}_i$ are derived from the heave, roll and pitch velocities using equations derived by combining and rearranging the previously described equations expressed in terms of velocities. For example, these body corner velocities $\dot{y}_i$ may be derived as follows:

$$\dot{Y}_1 = \dot{H} - (L_2/2)\dot{P} - (L_1/2)\dot{R},$$

$$\dot{Y}_2 = \dot{H} - (L_2/2)\dot{P} + (L_1/2)\dot{R},$$

$$\dot{Y}_3 = \dot{H} + (L_2/2)\dot{P} - (L_1/2)\dot{R},$$

$$\dot{Y}_4 = \dot{H} + (L_2/2)\dot{P} + (L_1/2)\dot{R}.$$

Thus, no further integrations are required; and the heave, roll, pitch velocities and all four wheel velocities are calculated with only three integrations when the conversion from body corner signals to heave, roll and pitch signals is accomplished before integration rather than after integration, which requires four such integrations. The saving of computational time is a significant extra benefit.

The input signal from the relative suspension displacement sensor 13 at that corner of the vehicle is differentiated to provide the relative body/wheel vertical velocity $\dot{y}_i - \dot{x}_i$. The difference between the vertical body corner velocity $\dot{y}_i$ and the relative body/wheel velocity $\dot{y}_i - \dot{x}_i$ yields the vertical wheel velocity $\dot{x}_i$ at that corner of the vehicle. It should be noted that both the vertical body corner velocity $\dot{y}_i$ and the vertical wheel velocity $\dot{x}_i$ are absolute velocities, referenced to an inertial reference frame and not to the road.

Figure 5:
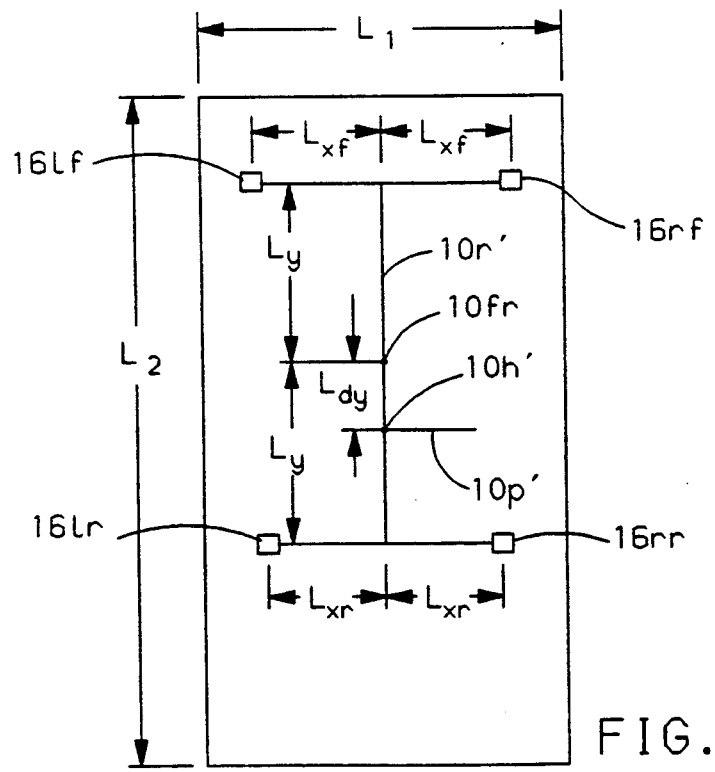
FIG. 5 shows an alternative placement of acceleration sensors in a suspension control according to this invention.

The example of the relationship shown above between body corner accelerations and heave, roll and pitch acceleration is the simplest possible, wherein the body corner acceleration sensors are located directly above the wheels and are symmetrical about both the pitch and roll axes with respect to point 10h'. However, this invention is not limited to such a case. A variation is shown in FIG. 5, wherein the body acceleration sensors are not placed above the wheel. Body acceleration sensors 16rf and 16lf in the front of the vehicle are more widely spaced ($L_{xf} + L_{xf}$) than body acceleration sensors 16rr and 16lr in the rear of the vehicle ($L_{xr} + L_{xr}$). In addition, this variation shows the sensor midpoint 10fr between a line joining the front sensors 16lf and 16rf and a line joining the rear sensors 16lr and 16rr to be a distance $L_{dy}$ removed from point 10h (the wheel base center), wherein the total distance between the lines is total length $L_{y+} L_y$ (corresponding to L2 in the previous example). $L_{dy}$ is positive if 10fr is in front of 10p' and negative if 10fr is behind 10p'. The equations for the heave, roll and pitch accelerations in this case are slightly altered, as follows:

$$\ddot{H} = \tfrac{1}{4}(\ddot{y}_{lf} + \ddot{y}_{rf} + \ddot{y}_{lr} + \ddot{y}_{rr}) + (L_{dy})\ddot{P},$$

$$\ddot{R} = (\ddot{y}_{rf} = \ddot{y}_{lf} + \ddot{y}_{rr} - \ddot{y}_{lr})/2(L_{xf} + L_{xr}),$$

$$\ddot{P} = (\ddot{y}_{lr} + \ddot{Y}_{rr} - \ddot{y}_{lf} - \ddot{y}_{rf})/4(L_y).$$

Again, all variables are accelerations. As earlier described, each of the heave, roll and pitch accelerations is then integrated to provide the heave, roll and pitch velocities.

Continuing with the flow chart of FIG. 4, the loop next selects system gains. Since no vehicle suspension can simultaneously maximize all aspects of vehicle ride and handling, the gains $G_{wi}$, $G_{hi}$, $G_{ri}$ and $G_{pi}$ are ordinarily computed during system development for a particular desired suspension behavior. For example, one set of gains for a particular vehicle may emphasize wheel control for maximum tire traction on rough road surfaces; whereas a different set of gains may emphasize body movement and attitude control during vehicle cornering or braking. Yet another possibility is a set of gains which produces a very soft, comfortable ride when the road surface is comparatively smooth, with only small amplitude, high frequency road input to the suspension. The control allows a great deal of flexibility in tailoring the "best" suspension behavior for appeal to a particular vehicle operator. However, since the suspension behavior is entirely software definable, one of the advantages of this system is the ease with which suspension performance may be modified in real time merely by the substitution of one set of gains for another in the control equations.

Referring again to FIG. 4, once the state variables computed from the input sensor signals (71) and the gains are chosen (72), the desired force $F_i$ at each corner of the vehicle may be computed (73) by use of the control equations previously described. Next, the program determines the actuator commands from the desired forces $F_i$ (74) and outputs the actuator commands to the actuators. The nature of these commands for the various types of actuators (active, continuous damper, discrete damper) is described in more detail in the aforementioned patent application U.S. Ser. No. 07/430,858. Briefly, the desired force itself is output to the actuator, within actuator limits, when the actuator is capable of providing such a force, such as with a fully active actuator capable of providing active power to the suspension or with a continuously variable damper when the desired force would produce dissipative power, as indicated by the signs of the desired force $F_i$ and relative body/wheel velocity $\dot{y}_i - \dot{x}_i$. When the desired force cannot be applied with a damper due to a requirement for active power to the suspension, the damper is opened to a minimum damping mode. In the case of a discrete, or "on/off" damper, the damper may be opened to a minimum damping mode even when dissipative power would be produced by the desired force if the desired force does not exceed a threshold value.

The embodiments of the invention in which an exclusive property or privilege is claimed are defined as follows:

1. A suspension control for a wheeled vehicle having a body suspended by suspension springs at a plurality of corners thereof on unsprung, road contacting wheels with a suspension actuator connected to exert a variable force between each of the wheels and the corresponding corner, the plurality of corners being sufficient to define heave, roll and pitch parameters for the body, the suspension comprising, in combination:

an absolute acceleration sensors mounted on the body at selected corners thereof to generate nominally vertical acceleration signals which may at times include non-vertical errors;

means for deriving vehicle body roll and pitch acceleration signals from the nominally vertical acceleration signals;

a bounded integrator for integrating the vehicle body roll and pitch acceleration signals to generate vehicle body roll and pitch velocity signals; and means for varying the force of each of the actuators in response to the vehicle body roll and pitch velocity signals, whereby the non-vertical error is reduced by cancellation in the derivation of vehicle body roll and pitch accelerations before the integration thereof to reduce saturation of the bounded integrator.

2. The suspension control of claim 1 in which the plurality of corners of the body is four.

3. The suspension system of claim 1 further comprising means for driving a vehicle body heave acceleration signal from the nominally vertical acceleration signals, integrating the body heave acceleration signal in the bounded integrator to generate a vehicle body heave velocity signal and deriving the body corner velocity at one of the corners of the body from the vehicle body heave, roll and pitch velocities.

4. The suspension control of claim 3 further comprising means for sensing the relative body/wheel velocity at the one corner of the body, means for deriving from the difference between the body corner velocity and relative body/wheel velocity the vertical wheel velocity of the wheel at the one corner of the body, the means for varying the force being further responsive to the vertical wheel velocity in deriving the force for the corresponding actuator.

* * * * *